US010426175B2

United States Patent
Meininger et al.

(10) Patent No.: US 10,426,175 B2
(45) Date of Patent: Oct. 1, 2019

(54) APPARATUS FOR ORIENTING SAUSAGES

(71) Applicant: VEMAG Maschinenbau GmbH, Verden (DE)

(72) Inventors: Thorsten Meininger, Verden (DE); Norman Greif, Bremen (DE); Oliver Brecht, Eystrup (DE); Gerd Scharninghausen, Kirchlinteln (DE)

(73) Assignee: VEMAG MASCHINENBAU GMBH, Verden (DE)

( * ) Notice: Subject to any disclaimer, the term of this patent is extended or adjusted under 35 U.S.C. 154(b) by 0 days.

(21) Appl. No.: 16/100,463

(22) Filed: Aug. 10, 2018

(65) Prior Publication Data

US 2019/0053505 A1    Feb. 21, 2019

(30) Foreign Application Priority Data

Aug. 16, 2017    (DE) .................... 20 2017 104 924 U

(51) Int. Cl.
    *A22C 11/00*    (2006.01)
    *B65G 47/248*   (2006.01)
(52) U.S. Cl.
    CPC .......... *A22C 11/008* (2013.01); *B65G 47/248* (2013.01); *B65G 2201/0202* (2013.01); *B65G 2201/0217* (2013.01)
(58) Field of Classification Search
    CPC ..... A22C 11/00; A22C 11/001; A22C 11/006; A22C 11/008; A22C 11/02; A22C 11/0209
    USPC ........... 452/21–26, 30–32, 35–37, 46–48, 51
    See application file for complete search history.

(56) References Cited

U.S. PATENT DOCUMENTS 5,057,055 A * 10/1991 Michaud .............. A22C 11/008
                                                452/182
5,102,368 A    4/1992 Strasser et al.
5,165,219 A * 11/1992 Sekiguchi .............. B65B 35/58
                                                 53/142

(Continued)

FOREIGN PATENT DOCUMENTS

DE    1220322 B    6/1966
DE    3731051 A1   3/1989

(Continued)

OTHER PUBLICATIONS

European Patent Office, Search Report issued in Application No. EP 18 18 4681 dated Dec. 13, 2018.

(Continued)

*Primary Examiner* — Richard T Price, Jr.
(74) *Attorney, Agent, or Firm* — Thompson Hine LLP

(57) ABSTRACT

Apparatus and methods for orienting a plurality of sausages with respective curvatures. A conveyor device is configured to transport the sausages along a conveyor path. The conveyor device includes a conveyor element on which the sausages can be placed at mutual spacings and with their longitudinal axis substantially perpendicular to a conveyor direction of the conveyor element. A turning device is arranged over the conveyor element. The turning device is configured to be brought into contact with each of the sausages and to orient the sausages oriented approximately transversely relative to the conveyor direction of the conveyor element in identical relationship in respect of the curvatures of the sausages.

20 Claims, 5 Drawing Sheets

(56) References Cited

U.S. PATENT DOCUMENTS

| | | | |
|---|---|---|---|
| 6,374,984 B1* | 4/2002 | Nagler | B07C 5/361 |
| | | | 177/1 |
| 6,779,647 B1* | 8/2004 | Nagler | A22C 17/0093 |
| | | | 198/395 |
| 7,258,604 B2* | 8/2007 | Reutter | A22C 11/008 |
| | | | 452/30 |
| 7,314,405 B2* | 1/2008 | Florindo | A22C 11/04 |
| | | | 452/31 |
| 9,470,513 B2 | 10/2016 | Fischer | |
| 9,554,581 B2 | 1/2017 | Willburger et al. | |
| 10,104,898 B2* | 10/2018 | Greif | A22C 15/002 |
| 2002/0115401 A1 | 8/2002 | Kobussen et al. | |
| 2018/0042248 A1 | 2/2018 | Knodel et al. | |
| 2018/0166844 A1 | 6/2018 | Maier et al. | |

FOREIGN PATENT DOCUMENTS

| | | |
|---|---|---|
| DE | 19507443 A1 | 9/1996 |
| EP | 3281259 A1 | 2/2018 |
| WO | 9928057 A1 | 6/1999 |
| WO | 2012144890 A1 | 10/2012 |

OTHER PUBLICATIONS

European Patent Office, Extended European Search reported dated Oct. 2, 2017 issued in European Patent Application No. EP 17 18 4953.2.

German Patent and Trademark Office, Official Action issued in Application No. 10 2016 114 731.1 dated Jan. 9, 2017.

German Patent and Trademark Office, Official Action issued in Application No. 10 2016 114 731.1 dated Apr. 25, 2019.

\* cited by examiner

APPARATUS FOR ORIENTING SAUSAGES

BACKGROUND

The invention concerns an apparatus for orienting sausages having a conveyor device for transporting the sausages along a conveyor path, with a preferably circulating conveyor element on which the sausages can be placed at mutual spacings and with their longitudinal axis substantially perpendicular to the conveyor direction of the conveyor element.

It is generally known for a plurality of sausages to be brought together to form a group of sausages and for that group of sausages then to be placed in a packaging. For placing the group of sausages in a packaging like for example a tray, a crucial consideration which frequently arises is that the sausages in the group are in the same orientation relative to each other. In particular, sausages with a natural casing skin usually involve a curvature so that the sausages with the natural casing skin are in particular to be oriented relative to each other in such a way that the successively arranged sausages respectively have their curvature in the same orientation so that for example they can be packaged uniformly and thus compactly.

The state of the art like for example DE 10 2016 114 731 discloses, for example, an apparatus for orienting sausages, in particular a so-called natural casing sorting device, having a conveyor device with a circulating conveyor means for transporting the sausages along a conveyor path. The sausages are firstly placed on the conveyor means or transferred on to same with their longitudinal direction substantially parallel to the path of movement of the conveyor device. Provided above the conveyor device are two conveyor elements which circulate in parallel relationship in the conveyor direction and which extend at a predetermined spacing in substantially parallel relationship and provide a kind of transport passage for the sausages to be oriented. After the sausages leave the front end of the transport passage as viewed in the conveyor direction the sausages, in dependence on their curvature, they are positioned by means of the conveyor elements more to the one side or to the other side on the conveyor device, thereby forming a kind of sorting device which in point of fact implements a sorting function.

SUMMARY

An object of the present invention is to provide an apparatus for orienting sausages, by means of which sausages which are already oriented approximately transversely relative to the conveyor direction of the conveyor device can be oriented in a simple and reliable fashion in such a way that even sausages with in particular a casing consisting of a natural skin leave the conveyor device with a uniformly oriented curvature.

In an apparatus for orienting sausages, there is provided a turning device which is arranged above the conveyor element and is adapted to orient the sausages oriented approximately transversely relative to the conveyor direction of the conveyor element in identical relationship with their curvatures on the conveyor element. Instead of displacing the sausages on the conveyor device with their front ends in the direction of one side or the other by means of a sorting device disposed above the conveyor device, the sausages which are oriented substantially transversely relative to the conveyor direction of the conveyor device are preferably turned on the conveyor element when passing the turning device in such a way that all sausages are then transported away with an identical curvature on the conveyor element. In an embodiment of the invention, the apparatus according to the invention is so designed that only the sausages which do not involve the desired orientation with their curvature on the conveyor device are turned by means of the turning device above the conveyor device.

In a preferred development of the invention, the turning device is adapted to turn the sausages on the conveyor element such that the curvatures of the sausages are respectively oriented to the left side or the right side. By means of the apparatus according to the invention, the sausages can assume as desired a left-sided or right-sided orientation on the conveyor belt. In the present specification, the term left-sided curvature, also referred to as left curvature, is used to denote a curvature of a sausage, in which the sausage is moved with its respective ends facing in the conveyor direction and with the back of the sausage, that is to say the central part of the sausage, is moved on the conveyor device facing in opposite relationship to the conveyor direction.

In contrast, the term right-sided curvature is used to denote the substantially transversely directed transport of the sausages in the conveyor direction, wherein in the case of a sausage with a curvature which is oriented to right side, also referred to as hereinafter as the right curvature, the sausage is transported with the sausage back facing in the conveyor direction and with the two sausage ends facing in opposite relationship to the conveyor direction. The actuation of the turning device according to the invention can provide that sausages with a left curvature or a left-sided curvature are turned on the conveyor device in such a way that they then have a right-sided curvature or a right curvature. In a further configuration of the invention, with the turning device according to the invention, all sausages with a right-sided curvature or right curvature are turned above the conveyor device in such a way that, after passing the turning device, all sausages on the conveyor device are then in a left-sided orientation or have a left curvature. Preferably, the sausages are rotated for turning about their longitudinal axis.

A development of the invention provides that the turning device has a rotatable and preferably driven turning roller which is arranged above the conveyor element and has a rotational surface engaging a portion of the sausage and the axis of rotation of which is oriented substantially perpendicularly to the conveyor direction of the conveyor element. The use of a drivable turning roller provides for simple and at the same time reliable turning of the sausage which is being respectively transported on the conveyor device and which is to be turned in particular about the longitudinal axis. The turning roller preferably engages a central portion of the sausage casing with its rotational surface, whereby a preferably uniform moment acts along the sausage casing in the direction of the two sausage ends which are preferably approximately uniformly spaced relative to the turning roller. Preferably, the turning roller is displaced in a continual rotary movement by means of a drive unit cooperating directly with the turning roller.

In a preferred embodiment, the axis of rotation of the turning roller extends in a plane in plane-parallel relationship with the surface of the conveyor device transporting the curved sausages. Preferably, in that case, the axis of rotation extends transversely relative to the conveyor direction, wherein the direction of rotation of the turning roller is preferably oriented in coincident relationship with the conveyor direction of the conveyor element for the curved sausages.

Preferably, the turning roller is drivable by means of a drive unit and in operation has a rotational speed at its rotational surface which can be brought into contact with the sausage, which is different from the conveyor speed of the conveyor element. This means that a relative speed is operative between the turning roller and top side of the conveyor element, and that relative speed provides that preferably the sausage in the incorrect orientation on the conveyor device is turned about its longitudinal axis on the conveyor element and is thus converted into the correct orientation. Preferably, the rotating turning roller is also operative on a correctly oriented sausage on a portion, preferably also on the central portion of the sausage. However, the ends of a sausage which is already correctly oriented are supported on the top side of the conveyor element. This means that further turning or excessive turning of a sausage which is already correctly oriented is counteracted by the curvature of the sausage itself. That makes it unnecessary to monitor or detect sausages which are already correctly oriented. Accordingly, sausages with the correctly oriented curvature and sausages with the incorrectly oriented curvature can be brought into contact with the turning device according to the invention to the same extent, in which case then only the sausages with the incorrect curvature are turned and the sausages with the correctly oriented curvature retain their original orientation in respect of their curvature on the conveyor element. The relative speed between the turning roller and the conveyor device disposed beneath same is achieved in particular by the rotational speed at the outer periphery of the turning roller, that is set to be different in relation to the conveyor speed of the conveyor element.

In a preferred configuration of the invention, the rotational direction at the rotational surface of the turning roller is the same as the conveyor direction of the conveyor element. The fact that the movement of the conveyor device and the turning roller is in the same direction provides for regulated control of the rotary movement of the sausage on the conveyor device whereby fine tuning in relation to the relative movement controlling the rotary movement of the sausages above the conveyor device is possible. Excessive rotation or excessive turning of a sausage which is already correctly oriented and deliberate turning of an incorrectly oriented sausage are thus ensured in a simple fashion.

Preferably, in operation, the rotational speed of the turning roller is greater or lesser than the conveyor speed of the conveyor element carrying the sausages. In dependence on the magnitude of the rotational speed, the sausages transported on the conveyor element are turned either in the one direction or in the opposite direction. In a preferred embodiment of the invention in which the rotational direction of the turning roller is the same as the conveyor direction of the conveyor element and the rotational speed of the turning roller is greater than the conveyor speed of the conveyor element, all sausages after passing the turning device are transported with their sausage ends leading in the conveyor direction. In another embodiment of the invention in which the rotational direction at the rotational surface of the turning roller is the same as the conveyor direction of the conveyor element but in contrast the rotational speed of the turning roller is less than the conveyor speed of the conveyor element, all sausages after passing the turning device are transported with their backs leading in the conveyor direction. In all embodiments as described hereinbefore and also hereinafter, the sausages which are preferably oriented transversely relative to the conveyor direction of the conveyor element, apart from their natural curvature, are rotated substantially about their longitudinal axis. In that case, the sausage itself rolls with its casing over the top side of the conveyor element of the apparatus according to the invention.

A further preferred configuration of the apparatus according to the invention provides that the conveyor element has at least one circulating transport belt. By means of a circulating transport belt which is coupled to a drive device, steady conveying movement of the sausages to be transported is ensured in a simple fashion. In addition, a rotary movement of the drive device, that is easy to produce, can be converted into a translation movement of the transport belt for transporting the sausages by means of a conveyor belt. In an embodiment, the transport belt has an upper run and a lower run, wherein the upper run provides in particular the top side of the conveyor element, on which the sausages are placed oriented with their longitudinal direction preferably transversely relative to the conveyor direction of the transport belt.

Preferably, the conveyor element has three mutually juxtaposed conveyor belts which are preferably separated from each other, with the turning roller arranged above the central conveyor belt. In a preferred embodiment of the invention, all conveyor belts which preferably provide individual belts arranged in mutually juxtaposed relationship approximately transversely with respect to the conveyor direction are driven by way of a drive device at the same conveyor speed. The sausages are therefore preferably moved uniformly along their conveyor path so that the same forces act at all portions of the sausages in the longitudinal direction.

In a preferred development of the apparatus according to the invention, the central conveyor belt is drivable at a first conveyor speed by means of a drive device and the outer conveyor belts are drivable at a second conveyor speed by means of the drive device or a separate drive device, wherein in operation the two outer conveyor belts involve a conveyor speed which is different from the conveyor speed of the central conveyor belt and is preferably greater than the conveyor speed of the central conveyor belt. In particular excessive turning of sausages with a curvature which is already correctly oriented is countered by means of the outer conveyor belts which move at a slightly higher conveyor speed than the central conveyor belt. A sausage with its curvature already oriented to the left is over-rotated a bit by a turning roller whose rotational speed is greater than the conveyor speed of the conveyor element, in which case the sausage ends facing in the conveyor direction are supported more strongly on the outer conveyor belts against the rotary movement produced by the turning roller at the central portion. By virtue of the higher conveyor speed of the outer belts however, a counteracting movement is produced in particular at the sausage ends, and that in turn preferably counteracts the over-rotation of the sausage. The difference in the conveyor speeds is preferably limited to a maximum difference in order to avoid overloading at the casing material of the sausage and thus bursting of the sausage casing.

Preferably, the turning roller is associated with the central conveyor belt and thus also the central portion of the sausage which is disposed on the conveyor element and which is to be turned. The turning or rotary movement of the sausage is thus produced in a portion of the sausage which causes a preferably uniform rotary movement of the entire sausage.

Preferably, the surfaces of the outer conveyor belts have a surface roughness which is different from the surface roughness of the central conveyor belt and preferably less than the surface roughness of the central conveyor belt. The surfaces of the outer conveyor belts have a smooth surface with a low level of adhesion. In particular, the ends of a sausage with the curvature already correctly oriented slide easily over the relatively smooth surfaces of the outer conveyor belts. Accordingly, a sausage with the orientation thereof already being correct, which in spite of everything is moved past the turning device, is prevented from over-rotation. The central conveyor belt preferably has a profiled surface which in contact with the turning roller arranged above same, reliably implements the rotary movement of the respective sausage to be turned. Slippage of the sausage relative to the central conveyor belt is avoided by the profiled surface thereof. In a preferred embodiment of the invention, the central conveyor belt has projections protruding from the plane of the conveyor belt to provide a profile structure at the surface.

In a preferred development of the apparatus according to the invention, the turning roller is at a fixed spacing relative to the top side of the conveyor element or is variable by means of an adjusting device in respect of the spacing relative to the top side of the conveyor element. Preferably, the driven turning roller is arranged at a fixed and therefore invariable spacing above the central conveyor belt of the conveyor element. Preferably, the spacing is less by a predetermined ratio than the diameter, also referred to as the caliber, of the sausages transported with the conveyor element. Preferably, the ratio of the spacing of the top side relative to the peripheral surface of the turning roller in relation to the caliber of the sausage being transported is in a range of about 0.75 to about 0.95. In another configuration, the spacing relative to the top side of the conveyor element is variable by means of an adjusting device, wherein the spacing of the rotational surface of the turning roller is altered by the sausages being guided below same. As a result, the rotational surface of the driven turning roller always reliably comes into contact with the sausage to be turned, or even not to be turned. For that purpose, the turning roller is preferably arranged variably in respect of height with respect to the top side of the conveyor element which preferably comprises three conveyor belts divided in mutually juxtaposed relationship. The adjusting device can have a first manually adjustable adjusting means for fixedly presetting the spacing of the turning roller above the conveyor element, like for example a manually operable spindle drive. In addition, in an embodiment of the invention, the adjusting device can have a second adjusting means which is drivable in automated fashion and which is preferably actuable by way of a control device of the apparatus according to the invention. The second adjusting means can be for example in the form of a fluid-operated stroke cylinder or an electrically drivable spindle drive. The second adjusting means is preferably arranged at the first adjusting means, with the turning roller being carried by the second adjusting means.

Preferably, the turning roller which is variable in respect of the spacing relative to the top side of the conveyor element is arranged at an end of a lever arm which is carried moveably about a rotary bearing. The spacing between the top side of the conveyor element and the turning roller which is carried variably with respect to the top side of the conveyor element is markedly smaller in comparison with the fixed turning roller. Preferably, the spacing corresponds to less than half the caliber of the sausage to be turned or not to be turned. The provision of a lever arm which itself is pivoted in its mounting point only through a predetermined small angular distance permits a change in spacing at the mounting point of the turning roller, that is markedly greater in relation to its lever arm length. Besides the turning roller, a drive unit which preferably continuously drives the turning roller, with at least one drive motor, for causing the turning roller to perform a rotary movement at a predetermined speed, is also provided at the one end of the lever arm.

In a development of the invention, arranged at the end of the lever arm, that is opposite to the turning roller, is a counterweight which substantially compensates for the mass of the roller. The counterweight provides that, when the moving sausage is brought into contact with the turning roller, the height of the turning roller above the conveyor belt can be varied with a slight amount of force. That avoids an excessively great pressure being applied to the sausage to be turned or not to be turned, in the central region thereof. The sausages being conveyed by the conveyor element thus retain their predetermined form over their entire length. Preferably, arranged at a portion of the lever arm is a return device which provides that, after the sausage passes, the turning roller is moved into a presettable initial height above the conveyor belt. The next sausage which is possibly to be turned therefore reliably comes into contact with the turning roller which is carried variably at a spacing relative to the top side of the conveyor element. In an embodiment of the invention, the return device can be for example a spring element.

According to a preferred development of the apparatus according to the invention for orienting sausages, there is provided a detection device having at least one sensor for detecting the orientation of the sausages on the conveyor element, wherein the sensor is preferably arranged before the turning device in the conveyor direction of the conveyor element. By means of the detection device which preferably has one or more sensors for detecting the orientation of the sausages being transported on the conveyor element, it is possible to recognize or determine the orientation of the sausages on the conveyor element, that is to say whether the sausages involve a left-sided or a right-sided curvature on the conveyor element, while still upstream of the turning device of the apparatus according to the invention. In particular, depending on the orientation of the sausages in respect of their curvature, it is possible to take steps which for example prevent contact of the turning device with certain sausages, preferably with sausages which are already in a correct orientation on the conveyor belt.

It is also possible with the detection device according to the invention to recognize whether the sausages to be conveyed are in a predetermined orientation on the conveyor element, in particular being oriented with their longitudinal axes in a predetermined angular range with respect to the conveyor direction of the conveyor element. Preferably, the at least one sensor of the detection device is arranged at a spacing upstream of the turning device in the conveyor direction of the conveyor element. In another embodiment, the detection device includes a plurality of sensors which are preferably arranged upstream of the turning device, but involving various orientations are directed on to a predetermined portion of the conveyor element upstream of the turning device. For example, an optical sensor like for example a camera is used as the sensor of the detection device.

Preferably, the detection device is coupled to a control device of the apparatus and is adapted in dependence on the detected orientation of the sausages on the conveyor element to actuate at least the turning device and/or the conveyor element.

Preferably, in dependence on the detected orientation of the curvature of the sausages, certain operating parameters are matched to the turning device and/or the conveyor element. Preferably, in an embodiment of the invention, in the case of a sausage having a correctly detected orientation of its curvature on the conveyor element, the turning device is actuated in such a way that the peripheral speed of the turning roller is adapted to the speed of the conveyor element by means of the drive unit, and in particular is driven at the same speed. In another embodiment the turning device is lifted by a predetermined minimum amount by means of the adjusting means of the adjusting device, that are actuable by way of the control device, so that the spacing of the turning roller relative to the top side of the conveyor element is preferably increased and the turning roller then no longer comes into contact with the correctly oriented sausage.

In a further embodiment, instead of the turning device, the conveyor element can also be controlled so that the conveyor speed of the conveyor element of the conveyor device is adapted in dependence on the detected orientation of the sausages which are preferably arranged at spacings in succession on the conveyor element.

In a development of the invention, the rotational surface of the turning roller is preferably made of a material having elastic properties. In that way it is possible to avoid damage to the casing or the casing material of the sausage upon being brought into contact with the rotational surface of the turning roller. Preferably, the material used is a natural rubber which is food-grade suitable and does not cause any adverse effect on the quality of the sausages brought into contact therewith. Preferably, the rotational surface at the turning roller is adapted to be interchangeable. Preferably, the turning roller has a core comprising a relatively hard plastic, at the outer peripheral surface of which the tube-like rotational surface which is in the form of a separate component can be arranged or fixed.

Preferably, provided at the rotational surface of the turning roller is a profiling, with which rotation of the sausages about their longitudinal direction is guaranteed in a simplified fashion. The profiling at the rotational surface is preferably in the form of a plurality of material projections which protrude at the rotational surface and which are preferably integrally connected to the rotational surface, preferably being in one piece with the peripheral surface.

According to a further preferred embodiment, it is proposed that the rotational surface of the turning roller is of a convexly curved configuration. According to a further embodiment of the invention, it is proposed that the width of the rotational surface of the turning roller is so selected and preferably the rotational surface of the turning roller and the sausage on the conveyor element are so positioned relative to each other that the rotational surface can be brought into contact with the sausage only in a central portion.

It is further provided that the spacing of the turning roller relative to the top side of the conveyor element is so matched to the caliber of the sausages that the turning roller somewhat substantially elastically deforms the sausage during the contact with a sausage. With the above development, the way in which contact occurs between the turning roller and the sausage is further optimized and the sausages can be particularly reliably oriented in respect of their curvature on the conveyor element.

A further aspect of the invention concerns a method of orienting curved sausages including the steps: moving the sausages at a spacing relative to each other along a predetermined conveyor path, wherein the sausages are oriented with their longitudinal axis substantially perpendicularly to the conveyor direction; and bringing the sausages moved in the conveyor direction successively into contact with a turning device, wherein rotation of the sausages about their longitudinal axis is produced by a relative movement prevailing between the surface of the sausage and the turning device. The invention is based on the realization that, by means of the method steps according to the invention, sausages with an incorrectly oriented curvature can be turned relatively easily on a conveyor device transporting the sausages, and sausages at an already correct orientation in respect of their curvature can also come into contact with the turning device without then those sausages being further turned or over-rotated so that they still retain their correct orientation. Thus, a specific or accurate monitoring and detection of the respective orientation of a sausage on the conveyor device is not necessary in that situation. That permits an orientation procedure which is markedly simplified in comparison with the state of the art.

In a preferred embodiment of the method according to the invention, a preferably driven turning roller which is disposed rotatably above the conveyor device and whose rotational speed is different in relation to the conveyor speed of the conveyor device transporting the sausages is used. The preferred embodiments or developments described in relation to the apparatus according to the invention are at the same time also preferred embodiments of the method of orienting sausages according to the invention.

Sausages arriving when already in the "correct" orientation on the conveyor belt come into contact with the surface of the turning roller but by virtue of their curvature are not set in rotation substantially about their longitudinal axis due to the two distal end portions as the distal end portions prevent the sausage from rotating. If a sausage in the "incorrect" orientation in respect of its curvature comes into the area of influence of the turning roller, then the sausage is caused to rotate substantially about the longitudinal axis of the curved sausages during the contact between the sausage and the turning roller by virtue of the rotational speed of the turning roller which is preferably somewhat greater than the corresponding conveyor speed of the conveyor belt, by virtue of the friction between the turning roller and the surface of the sausage. By virtue of the higher rotational speed of the turning roller, the distal ends of the curved sausage are rotated in a direction away from the surface of the conveyor belt so that they are turned through about 180° until the distal ends come into contact again with the surface of the conveyor belt. The sausage is as it were turned over by virtue of the engagement thereof with the driven turning roller, more specifically through about 180°. Then, after being influenced by the turning roller the sausage is resting on the conveyor belt in a precisely different fashion in respect of its curvature, and is thus oriented with the "correct" orientation in respect of its curvature. In other words, correctly oriented sausages are as it were pressed by the turning roller with their distal ends towards the conveyor belt but then are not rotated about their longitudinal axis, whereas incorrectly oriented sausages are rotated due to the influence of the turning roller with the distal ends of the sausage away from the conveyor belt and are then rotated through about 180° about the—curved—longitudinal axis of the sausage and then rest on the conveyor belt in a precisely reverse orientation in respect of their curvature. An orientation can thus be achieved in an effective and simple fashion such that after the sausage has moved past the turning roller, all sausages lie on the conveyor belt in uniformly oriented relationship in respect of their curvature. The turning roller is held variably in respect of its spacing above the conveyor element.

According to a preferred development of the method according to the invention, the orientation of the curvature of the sausage can also be detected or recognized before being brought into contact with the turning roller of the turning device. Detection or recognition of the orientation of the curvature of the sausage is preferably effected at a sufficient spacing of the sausage on the conveyor element upstream of the turning device by means of a detection device for detecting the orientation of the sausages. In dependence on the "correct" or "incorrect" orientation of the curvature of the sausage on the conveyor element, corresponding signals are communicated from the detection device to a control device of the apparatus according to the invention. The turning device is preferably actuated by means of the control device, involving in particular a variation in the rotational speed of the turning roller or adaptation of the spacing of the turning device above the conveyor element transporting the sausages. In a preferred configuration of the invention, instead of adaptation of the operating parameters of the turning device, it is possible also to provide for adaptation of the operating parameters, preferably the conveyor speed, of the conveyor device transporting the sausages.

The preferred embodiments and developments described in respect of the apparatus according to the invention are at the same time also preferred embodiments of the method of orienting curved sausages according to the invention.

BRIEF DESCRIPTION OF THE DRAWINGS

The invention is described in greater detail hereinafter by means of a preferred embodiment by way of example with reference to the accompanying Figures.

DETAILED DESCRIPTION

Figure 1:
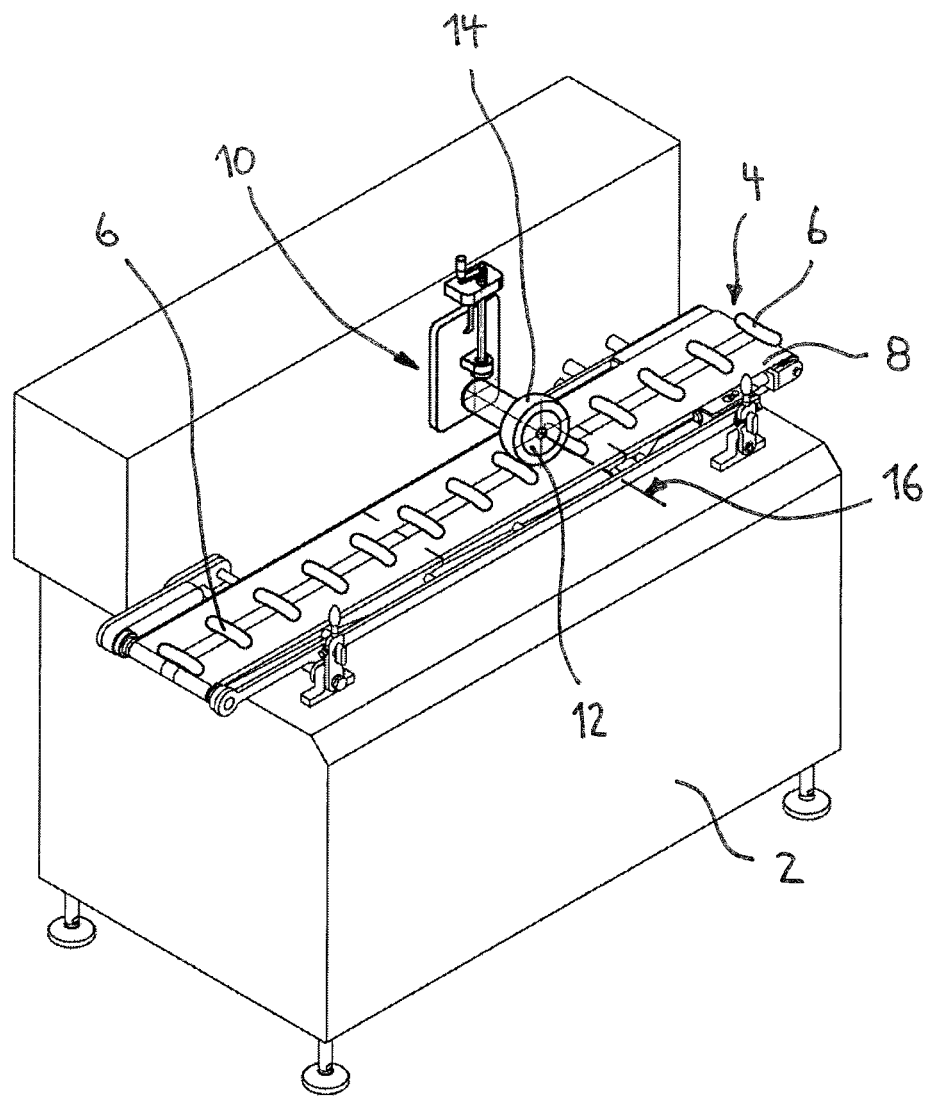
FIG. 1 shows a perspective view of an apparatus according to the invention for orienting sausages.

FIG. 1 shows an apparatus 1 for orienting sausages, which has a machine frame structure 2. The machine frame structure 2 carries a conveyor device 4 which is adapted to transport sausages 6 along a conveyor path. The sausages 6 are placed at a predetermined spacing relative to each other and with their longitudinal axis substantially perpendicular to the conveyor direction of the conveyor element 4.

The conveyor device 4 includes a circulating conveyor element 8 which in an embodiment is in the form of a conveyor belt. Arranged above the conveyor device 4 is a turning device 10 having a turning roller 12. The turning device 10 is adapted to orient the sausages 6 being transported on the conveyor element 8 successively on the conveyor device 4 in such a way, preferably turning them in such a fashion, that the sausages 6 oriented approximately transversely relative to the conveyor direction of the conveyor element 8 then involve an identical orientation with respect to their curvatures on the conveyor element 6.

In an embodiment of the invention, the turning device 10 with its turning roller 12 is adapted to be able to orient the sausages 6 on the conveyor element 8 in such a way that, after passing the turning device, the sausages 6 then have either a left-sided curvature or a right-sided curvature on the conveyor element 8. The turning roller 12 engages in particular with a rotational surface 14 on a portion of the sausage 6 on the conveyor element 8. The turning roller 12 is oriented with its axis of rotation 16 in particular perpendicularly to the conveyor direction 18 of the conveyor device 4.

Figure 2:
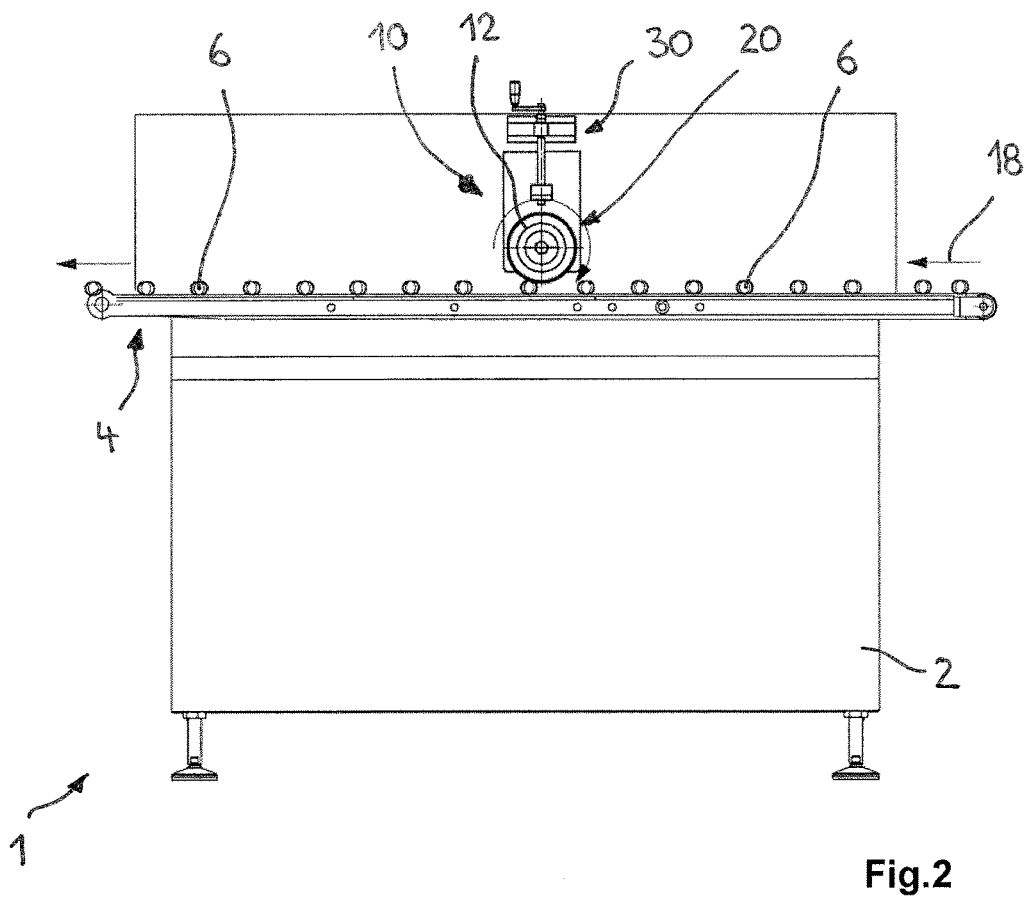
FIG. 2 shows a front view of the apparatus according to the invention as shown in FIG. 1.
Figure 3:
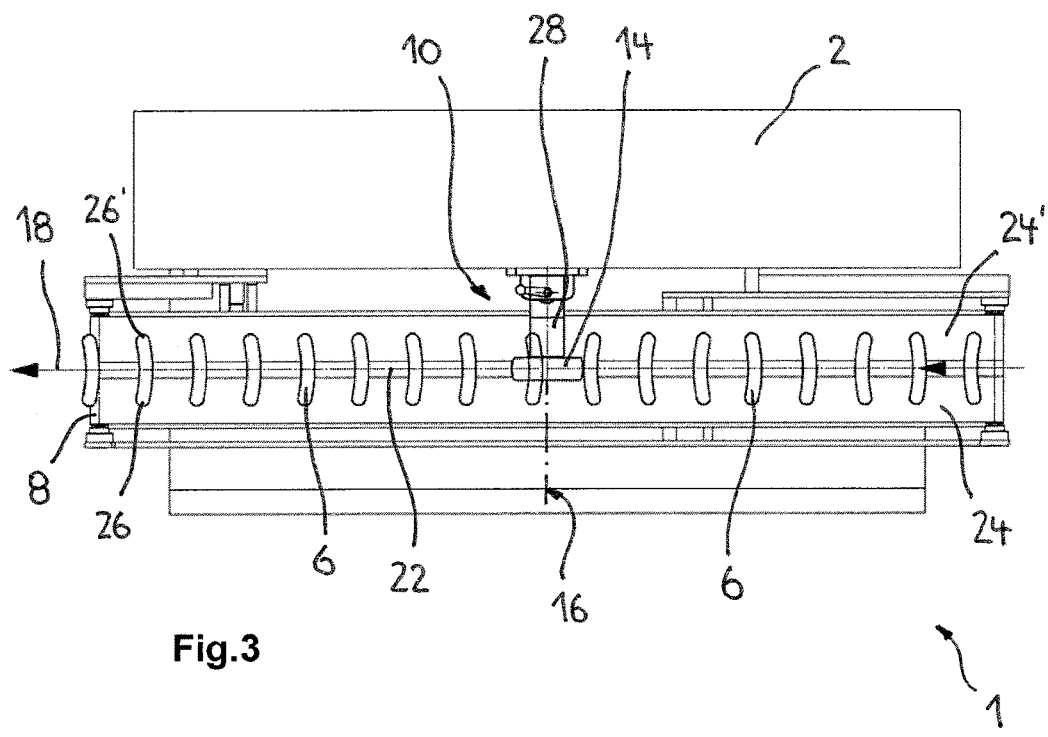
FIG. 3 shows a plan view of the apparatus according to the invention as shown in FIG. 1.

The turning roller 12 is drivable by means of a motor-driven drive unit 28. The drive unit preferably has an electric motor and a transmission. The turning roller 12 is mounted rotatably and in operation has at the rotational surface 14 a rotational speed which is different from the conveyor speed of the conveyor device 4. In the embodiment shown in FIG. 2, the rotational speed at the rotational surface 14 of the turning roller 12 is greater than the conveyor speed of the conveyor element of the conveyor device 4 so that, after the sausages have come into contact with the turning device, the sausages 6 are in an identical orientation with a left-sided curvature or left curvature (FIG. 3). As can also be seen from FIG. 2, the rotational direction 20 of the turning roller 12 on the side of the turning roller 12 that is towards the conveyor element 8 is identical to the conveyor direction 18 of the conveyor element 8.

FIG. 3 shows that the conveyor element 8 is formed by three mutually juxtaposed conveyor belts 22, 24, 24' which are separated from each other. In that arrangement the turning roller 12 is arranged above the central conveyor belt 22. In the illustrated embodiment, all conveyor belts 22, 24, 24' are driven at the same conveyor speed by a conveyor drive (not shown in greater detail) of the apparatus 1. The conveyor belt 22 differs from the conveyor belts 24, 24' by virtue of its greater surface roughness. Together with the turning device 10, the conveyor belt 22 is intended to ensure that the sausages 6 are reliably turned. In a preferred embodiment, the conveyor belts 24, 24' have a flat or smooth surface with a low degree of surface roughness, thereby ensuring that in particular sausages which are already correctly oriented on the conveyor element 8 are not over-rotated by means of the turning device 10 according to the invention on the conveyor device 4 so that they ultimately would then face in the wrong direction with their ends 26, 26'.

Figure 4:
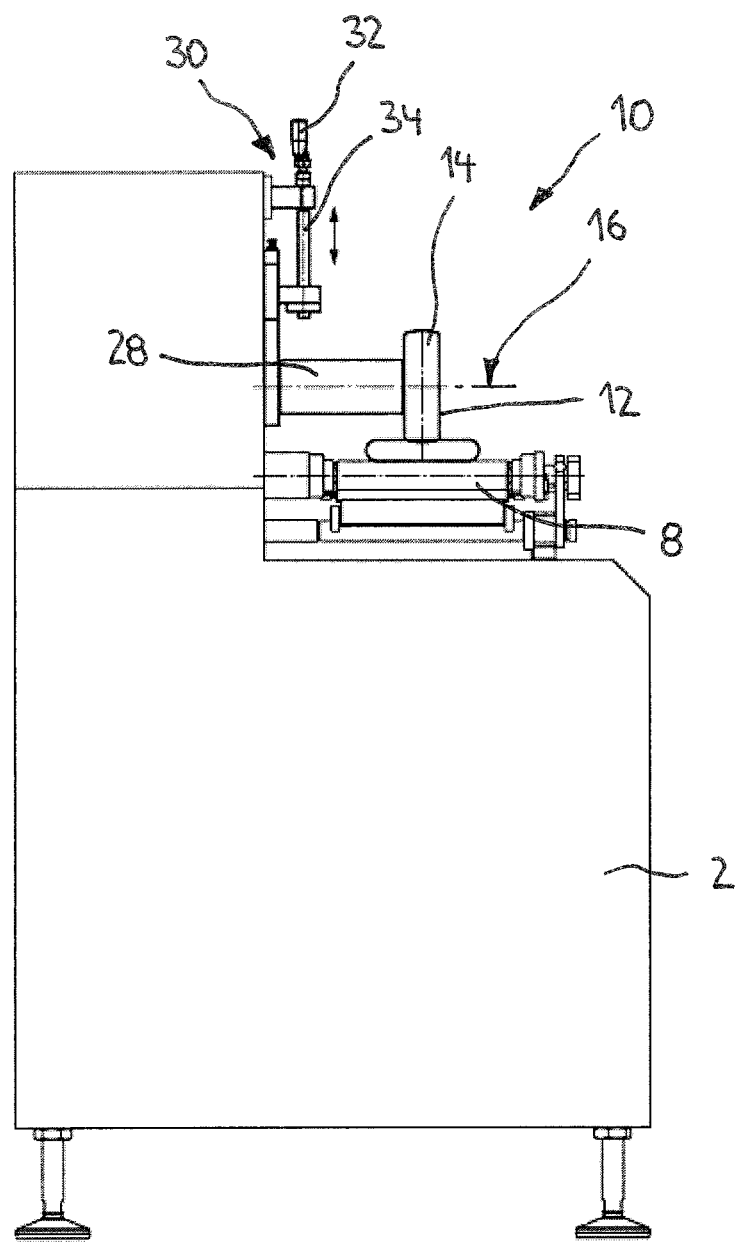
FIG. 4 shows a side view of the apparatus according to the invention as shown in FIG. 1.

FIG. 4 shows a side view of the apparatus 1 according to the invention, making it clear that the turning roller 12 is arranged at a predetermined spacing above the conveyor element 8, preferably directly above the central conveyor belt 22. In that arrangement, the spacing between the rotational surface 14 and the conveyor element 8, in particular the central conveyor belt 22, is so selected that it is smaller than the diameter of the sausages 6. In an embodiment, the spacing of the rotational surface 14 relative to the top side of the conveyor element 8 in the ratio to the diameter of the sausages 6 to be turned is in a range of between 0.75 and 0.95.

The turning roller 12 which is caused to perform a uniform rotary movement by means of the drive unit 28 has in an embodiment a fixed spacing relative to the top side of the conveyor element 6. In the embodiment shown here, the spacing between the turning roller 12 relative to the top side of the conveyor element 6 is variable. For that purpose, provided on the machine frame structure 2 is an adjusting device 30 for height adjustment of the turning device 10. In the illustrated embodiment, the height adjusting device 30 has a manually operable adjusting lever 32 which by way of a spindle 34 causes height adjustment of the turning device 10.

In an embodiment of the invention that is not shown, the turning device 10 has a turning roller arranged at one end of a lever arm mounted pivotably to the machine frame structure 2.

In addition, as can be seen from the Figures, the rotational surface 14 of the turning roller 12, that comes into contact with the sausages 6, is made from a material having soft-elastic properties. In an embodiment of the invention that is not shown here, provided on the rotational surface 14 of the turning roller 12 are profilings for effective transmission of the torque produced by the turning roller to the individual sausages 6. The sausages on the conveyor device 4 are rotated with the turning device 10 about their longitudinal axis approximately through an angular extent of about 180° by a relative movement occurring between the turning roller 12 and the conveyor element 8. The relative movement between the turning roller 12 and the conveyor device 4 is produced by means of the mutually differing rotational and conveyor speeds.

Figure 5:
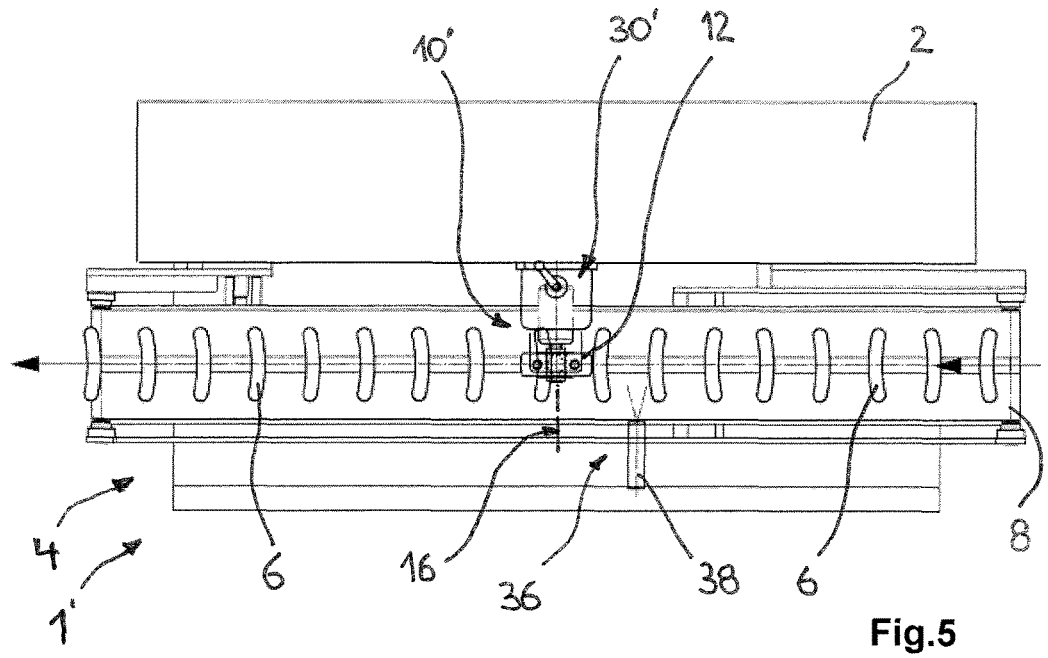
FIG. 5 shows a plan view of an apparatus according to a second embodiment.

FIG. 5 shows a plan view of a second embodiment of an apparatus 1' according to the invention, which has a machine frame structure 2 with a conveyor device 4 arranged thereon for the sausages 6 which are to be conveyed thereon and correspondingly oriented. For transporting the sausages, the conveyor device 4 has a conveyor element 8. Disposed above the conveyor device 4 is a turning device 10' having a turning roller 12, by means of which sausages 6 which are in an "incorrect" orientation in respect of their curvature on the conveyor device 4 are converted into the correspondingly desired "correct" orientation, as described hereinbefore in relation to the first embodiment of the apparatus shown in FIGS. 1 to 4.

Figure 6:
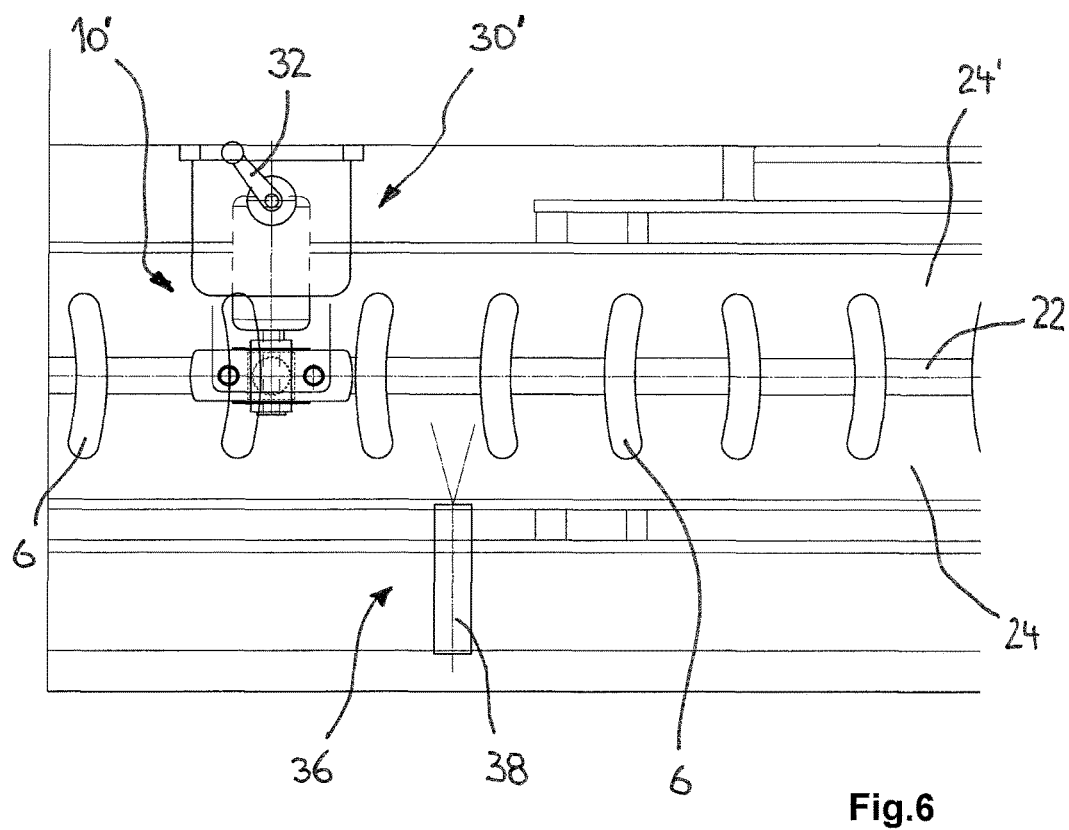
FIG. 6 shows an enlarged view of the encircled part V in FIG. 5.

The embodiment of the apparatus 1' shown in FIGS. 5 and 6 further includes a detection device 36 for detecting the orientation of the sausages on the conveyor element, comprising at least one optical sensor 38 which detects or recognizes the orientation of the curvature of the sausages 6 on the conveyor element 8. Detection of the orientation of the sausages 6 on the conveyor element 8 is effected by the detection device 36 at a spacing upstream of the turning device 10'. In dependence on whether the transported sausages 6 are or are not in the desired orientation on the conveyor element 8, the turning device and/or the conveyor element 8 is actuated in such a way that incorrectly oriented sausages 6 are turned by the turning roller 12 on the conveyor element 8 and sausages 6 which are already correctly oriented on the conveyor element 8 are not turned. In an embodiment of the invention, a relative speed is generated between the peripheral speed of the turning roller 12 and the conveyor speed of the conveyor element 8 for rotating or turning over the sausages 6 on the conveyor element 8. If the sausages retain their orientation on the conveyor element, then in the present embodiment the rotational speed of the turning roller 12 is adapted to the conveyor speed of the conveyor element 8 so that those two are the same and thus no relative movement of the sausage 6 relative to the top side of the conveyor element 8 is produced by means of the turning roller 12.

Figure 7:
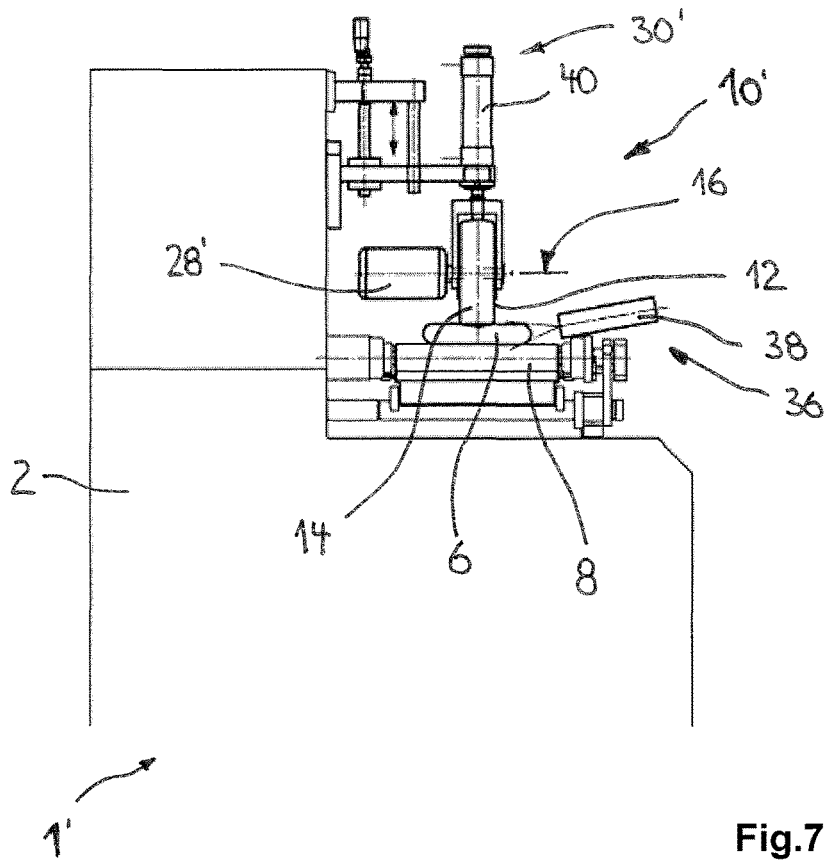
FIG. 7 shows a side view of an apparatus according to the invention in the second embodiment.

FIG. 7 shows a side view of the apparatus 1' with the conveyor device 4 arranged on the machine frame structure 2 and the turning device 10' with the turning roller 12, that is disposed above the conveyor element 8 of the conveyor device 4.

The turning roller 12 has a rotational surface 14 which is brought into contact with the sausages 6 to rotate the sausages 6 on the conveyor element 8. If the optical sensor 38 of the detection device 36, that is arranged upstream of the turning device 10' in the conveyor direction 18 detects or recognizes that the sausage on the conveyor element 8 is in a correct orientation, then in an embodiment of the apparatus according to the invention the height of the turning device 10' above the conveyor element 8, in particular the spacing of the rotational surface 14 of the turning roller 12 relative to the top side of the conveyor element 8, can be altered by means of the adjusting device 30'.

In the illustrated structure, the adjusting device 30' has a first, manually adjustable adjusting means for possible mechanical fixed adjustment or pre-setting of the spacing of the turning roller 12 above the conveyor element 8 by means of the adjusting lever 32 and the spindle 34. In addition, there is a second adjusting means at the adjusting device 30', with which the height of the turning roller 12 can be adapted in an automated procedure by way of a stroke cylinder 40 as a second adjusting means. The cylinder 40 is in fluid communication with a fluid-operated adjusting device (not shown). In an embodiment of the invention, operation of the fluid-operated adjusting device with its stroke cylinder 40 is effected by way of an electronic control unit (not shown) of the apparatus 1', which is coupled or connected in signal-transmitting relationship to the detection device 36 for detecting the orientation of the sausages on the conveyor element 8.

Figure 8:
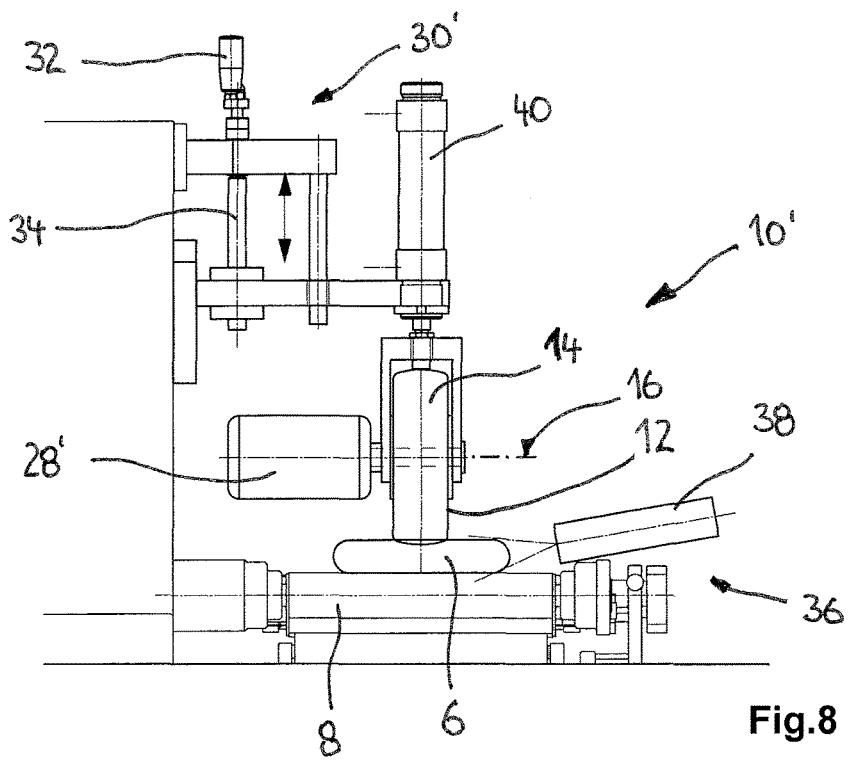
FIG. 8 shows a detail view of the second embodiment in accordance with the encircled part VII in FIG. 7.

FIG. 8 shows a detail view of the turning device 10' according to the invention with its turning roller 12 and the adjusting device 30' accommodating the turning roller 12. The drive unit 28' for the turning roller 12 is also held by means of the adjusting device 30'. In the illustrated embodiment of the invention, the drive unit 28 is arranged in coaxial relationship with the axis of rotation 16 of the turning roller 12. As in the previous embodiment, the turning roller 12 also includes a convexly shaped rotational surface 14 of preferably a material having soft-elastic properties, which is brought into contact with a central portion of a sausage to be turned.

Identical or similar components are denoted by the same references.

LIST OF REFERENCES

1, 1' apparatus
2 machine frame structure
4 conveyor device
6 sausages
8 conveyor element
10, 10' turning device
12 turning roller
14 rotational surface
16 axis of rotation
18 conveyor direction
20 rotational direction
22 conveyor belt
24, 24' conveyor belt
26, 26' sausage ends
28, 28' drive unit
30, 30' adjusting device
32 adjusting lever
34 spindle 36 detection device
38 sensor
40 stroke cylinder

What is claimed is:

1. An apparatus for orienting a plurality of sausages with respective curvatures, the apparatus comprising:
   a conveyor device configured to transport the sausages along a conveyor path, the conveyor device including a conveyor element on which the sausages can be placed at mutual spacings and with their longitudinal axis substantially perpendicular to a conveyor direction of the conveyor element; and
   a turning device arranged over the conveyor element, the turning device configured to be brought into contact with each of the sausages and to orient the sausages oriented approximately transversely relative to the conveyor direction of the conveyor element in identical relationship in respect of the curvatures of the sausages.

2. The apparatus of claim 1 wherein the turning device is configured to turn the sausages on the conveyor element such that the curvatures of the sausages are respectively oriented to the left side or the right side.

3. The apparatus of claim 1 wherein the turning device has a turning roller that is arranged over the conveyor element and that has a rotational surface arranged to engage a portion of each sausage, the turning roller having an axis of rotation that is oriented substantially perpendicularly to the conveyor direction of the conveyor element.

4. The apparatus of claim 3 further comprising:
   an adjusting device configured to adjust a spacing of the turning roller relative to a top side of the conveyor element.

5. The apparatus of claim 4 further comprising:
   a rotary bearing; and
   a lever arm that is carried moveably about the rotary bearing,
   wherein the turning roller is arranged at a first end of the lever arm.

6. The apparatus of claim 5 further comprising:
   a counterweight having a mass that substantially compensates for a mass of the turning roller, the counterweight arranged at a second end of the lever arm opposite from the first end of the lever arm.

7. The apparatus of claim 3 wherein the rotational surface of the turning roller is made from a material having soft-elastic properties.

8. The apparatus of claim 3 wherein the rotational surface of the turning roller and/or the rotational surface has a convexly curved profiling.

9. The apparatus of claim 3 further comprising:
   a drive unit configured to drive the turning roller with a rotational speed at the rotational surface that is different from a conveyor speed of the conveyor element.

10. The apparatus of claim 9 wherein a rotational direction at the rotational surface of the turning roller is the same as the conveyor direction of the conveyor element.

11. The apparatus of claim 10 wherein the rotational speed of the turning roller is greater or lesser than the conveyor speed of the conveyor element.

12. The apparatus of claim 3 wherein the rotational surface of the turning roller has a width selected and the rotational surface of the turning roller and each sausage on the conveyor element are positioned relative to each other such that the rotational surface of the turning roller can be brought into contact with each sausage only in a central portion.

13. The apparatus of claim 3 wherein the spacing of the turning roller relative to the top side of the conveyor element is so matched to a caliber of the sausages that the turning roller somewhat substantially elastically deforms each sausage during contact therebetween.

14. The apparatus of claim 3 wherein the conveyor element has a first outer conveyor belt, a second outer conveyor belt, and a central conveyor belt arranged between the first outer conveyor belt and the second outer conveyor belt, and the turning roller is arranged above the central conveyor belt.

15. The apparatus of claim 14 wherein the central conveyor belt is configured to be driven at a first conveyor speed, and the first outer conveyor belt and the second outer conveyor belt are configured to be driven at a second conveyor speed that is greater than the first conveyor speed.

16. The apparatus of claim 15 wherein the first outer conveyor belt and the second outer conveyor belt each have a surface with a surface roughness that is less than a surface roughness of the central conveyor belt.

17. The apparatus of claim 1 wherein the conveyor element has at least one circulating transport belt.

18. The apparatus of claim 1 further comprising:
   a detection device including a sensor configured to detect an orientation of each sausage on the conveyor element, the sensor arranged before the turning device in the conveyor direction of the conveyor element.

19. The apparatus of claim 18 further comprising:
   a control device coupled to the detection device, the control device configured to actuate the turning device and/or the conveyor element based on the orientation of each sausage detected by the detection device.

20. A method of orienting curved sausages, the method comprising:
   moving the sausages at a spacing relative to each other along in a conveyor direction along a predetermined conveyor path, wherein each sausage has a longitudinal axis oriented substantially perpendicularly to the conveyor direction; and
   bringing the sausages moved in the conveyor direction successively into contact with a turning device, wherein rotation of each sausage substantially about the longitudinal axis is produced by a relative movement prevailing between each sausage and the turning device.

* * * * *